United States Patent
Miller et al.

(10) Patent No.: US 9,946,134 B2
(45) Date of Patent: Apr. 17, 2018

(54) VARIABLE OPTICAL RETARDER

(71) Applicant: Lumentum Operations LLC, Milpitas, CA (US)

(72) Inventors: John Michael Miller, Gatineau (CA); Gonzalo Wills, Ottawa (CA)

(73) Assignee: Lumentum Operations LLC, Milpitas, CA (US)

( * ) Notice: Subject to any disclaimer, the term of this patent is extended or adjusted under 35 U.S.C. 154(b) by 721 days.

(21) Appl. No.: 13/962,069

(22) Filed: Aug. 8, 2013

(65) Prior Publication Data

US 2014/0055695 A1 Feb. 27, 2014

Related U.S. Application Data

(60) Provisional application No. 61/692,896, filed on Aug. 24, 2012.

(51) Int. Cl.
| | | |
|---|---|---|
| *G02F 1/1335* | (2006.01) | |
| *G02B 5/32* | (2006.01) | |
| *G02B 5/30* | (2006.01) | |
| *G02F 1/153* | (2006.01) | |

(52) U.S. Cl.
CPC ......... *G02F 1/1533* (2013.01); *G02B 5/3083* (2013.01); *G02B 5/32* (2013.01); *G02F 1/133504* (2013.01); *G02F 2201/307* (2013.01)

(58) Field of Classification Search
CPC ............. G02F 2201/307; G02F 1/1335; G02F 1/133504; G02B 5/32; G02B 5/3083
See application file for complete search history.

(56) References Cited

U.S. PATENT DOCUMENTS

| | | | | |
|---|---|---|---|---|
| 4,729,640 A | * | 3/1988 | Sakata | G02F 1/133371 |
| | | | | 349/137 |
| 7,918,600 B2 | | 4/2011 | Nagata et al. | |
| 2002/0047965 A1 | * | 4/2002 | Suzuki | G01R 31/31905 |
| | | | | 349/113 |
| 2005/0078237 A1 | | 4/2005 | Klaus et al. | 349/98 |
| 2006/0055865 A1 | * | 3/2006 | Chuang | G02F 1/1326 |
| | | | | 349/196 |
| 2006/0256263 A1 | | 11/2006 | Shimizu et al. | |
| 2007/0070276 A1 | | 3/2007 | Tan et al. | 349/117 |
| 2008/0043187 A1 | | 2/2008 | Mimura et al. | 349/114 |

(Continued)

FOREIGN PATENT DOCUMENTS

| | | | | |
|---|---|---|---|---|
| EP | 1420275 | 5/2004 | | G02B 5/30 |
| EP | 1780582 | 5/2007 | | G02F 1/13 |

(Continued)

OTHER PUBLICATIONS

EP Search Report from corresponding EP application No. 13179773.0.

(Continued)

*Primary Examiner* — Dennis Y Kim

(74) *Attorney, Agent, or Firm* — Harrity & Harrity, LLP

(57) ABSTRACT

A sub-wavelength grating is placed inside a liquid crystal variable optical retarder to reduce polarization dependence of the optical retardation generated by the variable optical retarder. A small thickness of the sub-wavelength grating, as compared to a conventional waveplate, reduces the driving voltage penalty due to the in-cell placement of the sub-wavelength grating.

20 Claims, 7 Drawing Sheets

(56) References Cited

U.S. PATENT DOCUMENTS

| | | | |
|---|---|---|---|
| 2008/0218862 A1 | 9/2008 | Kekas | |
| 2009/0231702 A1* | 9/2009 | Wu | G02B 5/3058 359/485.01 |
| 2010/0026930 A1* | 2/2010 | Jepsen | G02B 5/18 349/62 |
| 2010/0260030 A1* | 10/2010 | Tao | G02B 5/1828 369/112.02 |
| 2013/0070326 A1 | 3/2013 | Frisken et al. | 359/279 |
| 2016/0291405 A1 | 10/2016 | Frisken et al. | |

FOREIGN PATENT DOCUMENTS

| | | |
|---|---|---|
| JP | 09160013 | 6/1997 |
| JP | 10104565 | 4/1998 |
| JP | 11326899 | 11/1999 |
| JP | 2007500873 | 1/2007 |
| JP | 2007199241 | 8/2007 |
| JP | 2008292591 | 12/2008 |
| JP | 2009064775 | 3/2009 |
| JP | 2011154327 | 8/2011 |
| JP | 2011191461 | 9/2011 |
| JP | 2012037396 | 2/2012 |
| JP | 2012074111 | 4/2012 |
| JP | 2012108354 | 6/2012 |
| WO | WO 2007138860 | 12/2007 |
| WO | WO 2013/117903 | 8/2013 |

OTHER PUBLICATIONS

G. D. Love, "Liquid-Crystal Phase modulator for unpolarized light", Appl. Opt., vol. 32, No. 13, pp. 2222-2223, May 1, 1993.

James et. al., "Modeling of the diffraction efficiency and polarization sensitivity for a liquid crystal 2D spatial light modulator for reconfigurable beam steering", J. Opt. Soc. Am. A, vol. 24, No. 8, pp. 2464-2473, Aug. 8, 2007.

Moore et. al., "The Silicon Backplane Design for an LCOS Polarization-Insensitive Phase Hologram SLM", IEEE Phot. Tech. Left. vol. 20, No. 1, pp. 60-62, Jan. 1 2008.

Kelly et al., "White-light performance of a polarization-independent liquid-crystal phase modulator", Appl. Opt. vol. 38, No. 10, pp. 1986-1989, Apr. 1, 1999.

Kok et al., "Relative phases of electromagnetic waves diffracted by a perfectly conducting rectangular-grooved grating", J. Opt. Soc. Am. A, vol. 5 No. 1., pp. 65-73, Jan. 1988.

Ahderom et. al. "Dynamic WDM Equalizer Using Opto-VLSI Beam Processing", IEEE Photon. Tech. Left. vol. 15, No. 11, pp. 1603-1605, Nov. 2003.

James et al., "Modeling of the diffraction efficiency and polarization sensitivity for a liquid crystal 2D spatial light modular for reconfigurable beam steering", Journal of the Optical Society of America A vol. 24 No. 8, (2007) pp. 2464-2473.

International Search Report and Written Opinion dated Mar. 5, 2015 for PCT Application No. PCT/US2014/065526, 11 pages.

* cited by examiner

VARIABLE OPTICAL RETARDER

CROSS-REFERENCE TO RELATED APPLICATIONS

The present invention claims priority from U.S. Provisional Patent Application No. 61/692,896 filed Aug. 24, 2012, which is incorporated herein by reference.

TECHNICAL FIELD

The present invention relates to optical retarders, and in particular to variable optical retarders for imparting a variable phase delay to an optical beam.

BACKGROUND OF THE INVENTION

Liquid crystal variable optical retarders are used to impart a variable optical phase delay, and/or change the state of polarization of an optical beam. In a typical liquid crystal variable optical retarder, a few micrometers thick layer of a liquid crystal fluid is sandwiched between two transparent electrodes. When a voltage is applied to the electrodes, an electric field between the electrodes orients liquid crystal molecules, which are highly anisotropic. Field-induced orientation of the liquid crystal molecules changes an effective index of refraction of the liquid crystal layer, which affects an optical phase of an optical beam propagating through the liquid crystal layer. When the optical beam is linearly polarized at 45 degrees to a predominant direction of orientation of the liquid crystal molecules termed "director", the induced optical phase difference can change the polarization state of the optical beam, for example, it can rotate the linear optical polarization. When the optical beam is linearly polarized along the predominant direction of orientation of the liquid crystal molecules, a variable optical phase delay is imparted to the optical beam by the variable optical retarder.

Arrays of variable optical retarders can be constructed by arranging an array of individually controllable pixels under a common liquid crystal layer. When a linearly polarized optical beam illuminates such an array, pre-determined optical phase patterns can be imparted to the beam, allowing variable focusing or steering of the optical beam without any moving parts. Arrays of variable optical retarders have found a variety of applications in beam scanning/steering, optical aberrations correction, and so on.

One disadvantage of liquid crystal variable retarders is that they typically require a polarized optical beam for proper operation. This disadvantage, however, is not intrinsic and may be overcome by using an appropriate polarization diversity arrangement. By way of example, G. D. Love in an article entitled "Liquid-Crystal Phase modulator for unpolarized light", *Appl. Opt.*, Vol. 32, No 13, p. 2222-2223, 1 May 1993, disclosed a reflective polarization-insensitive variable optical retarder. Referring to FIG. 1, a variable optical retarder 10 of Love has a quarter-wave plate (QWP) 11 disposed between a liquid crystal cell 12 and a mirror 13. In operation, an incoming vertically linearly polarized (V-LP) optical beam 14 propagates through the liquid crystal cell 12, the quarter-wave plate 11, and is reflected by the mirror 13 to propagate back through the quarter-wave plate 11 and the liquid crystal cell 12. The reflected optical beam is shown at 16. The liquid crystal cell 12 has a director 15 oriented vertically; therefore, the variable optical phase delay will be imparted on the optical beam 14 on the first pass, without changing its state of polarization. The quarter-wave plate 11 is oriented to change the vertical state of polarization to a left hand-circular polarization (LH-CP), which accordingly changes to a right hand-circular polarization (RH-CP) upon reflection from the mirror 13. On the second pass, the quarter-wave plate 11 changes the right hand-circular polarization to horizontal linear polarization (H-LP), which will not be changed by the liquid crystal cell 12, since its director 15 is oriented perpendicular to it, that is, is oriented vertically. One can see that, if the incoming optical beam 14 were horizontally polarized (not shown for simplicity), it would be reflected vertically polarized and phase-delayed by the same amount, only not on the first but the second pass through the liquid crystal cell 12. Therefore, if the optical beam 14 were unpolarized or randomly polarized, it would be phase-delayed by a same amount regardless of its state of polarization. Thus, the variable optical retarder 10 is polarization-insensitive.

One drawback of the variable optical retarder 10 of FIG. 1 is that placing the quarter-wave plate 11 between the liquid crystal cell 12 and the mirror 13 increases a distance D between the mirror 13 and the liquid crystal cell 12. This is detrimental, because the incoming optical beam 14 diverges while propagating through the distance D. The beam divergence increases the beam spot size on the liquid crystal cell 12. The increased beam spot size is detrimental in a variable retarder array configuration, in which the liquid crystal cell 12 is pixilated, because it reduces the spatial resolution.

Another disadvantage of the variable optical retarder 10 is that the liquid crystal cell 12 has to be transmissive to accommodate the external quarter-wave plate 11. Transmissive liquid crystal cells usually have a higher optical loss in a double-pass configuration than reflective liquid crystal cells in a single-pass configuration, because in a transmissive cell, the incoming light has to pass twice through two transparent electrodes. The transparent electrodes have to both conduct electricity and transmit light. These requirements are somewhat contradictory, and as a result, the transparent electrodes usually introduce some extra optical loss into the system.

James et. al. in an article entitled "Modeling of the diffraction efficiency and polarization sensitivity for a liquid crystal 2D spatial light modulator for reconfigurable beam steering", *J. Opt. Soc. Am. A*, Vol 24, No. 8, p. 2464-2473, discloses a reflective polarization-insensitive liquid crystal retarder array, in which one of the electrodes is made highly reflective, and the quarter-wave plate is placed inside the liquid crystal cell. The resulting optical loss is lower in this case, because in the James device, the incoming optical beam passes twice through a single transparent electrode, not through two electrodes. However, inside placement of the quarter-wave plate reduces electrical field across the liquid crystal layer, thus requiring a higher driving voltage to compensate for the electric field decrease.

SUMMARY OF THE INVENTION

It is an objective of the invention to provide a variable optical retarder, in which the polarization sensitivity would be reduced without excessive optical loss or driving voltage penalties.

In accordance with the invention, a dielectric or semiconductor sub-wavelength grating is placed inside a liquid crystal variable optical retarder between an electrode and a liquid crystal layer. The sub-wavelength grating acts as a quarter-wave plate, while having a very small thickness, so that the driving voltage penalty due to the in-cell placement of the sub-wavelength grating is lessened. The sub-wavelength grating can also be made highly reflective, for example, it can include a multilayer dielectric high reflector, which further reduces optical loss in comparison with a metal reflector.

In accordance with one aspect of the invention, there is provided a liquid crystal variable optical retarder comprising:

a first continuous flat electrode;

a second substantially transparent continuous flat electrode opposed to the first electrode;

a liquid crystal layer having a director and disposed between the first and second electrodes, for imparting a variable optical phase shift to light impinging on the second electrode when a voltage is applied between the first and second electrodes; and a sub-wavelength grating disposed between the liquid crystal layer and the first electrode and having grating lines at an acute angle, preferably 45 degrees, to the director.

In accordance with the invention, there is further provided a variable optical retarder for imparting a variable phase delay to an optical beam impinging thereon, the variable optical retarder comprising:

a substrate having a pixel electrode;

a sub-wavelength grating disposed on and separate from the pixel electrode, for imparting a first optical retardation to the optical beam impinging thereon, the sub-wavelength grating having a plurality of grating lines running parallel to each other;

a liquid crystal layer on the sub-wavelength grating, for imparting a second optical retardation to the optical beam propagating therethrough; and a substantially transparent backplane electrode on the liquid crystal layer;

wherein the second optical retardation is varied when a voltage is applied between the pixel and backplane electrodes, thereby imparting the variable phase delay to the optical beam propagating through the liquid crystal layer;

wherein a director of the liquid crystal layer forms an acute angle with the grating lines, whereby sensitivity of the variable optical retarder to a state of polarization of the optical beam is lessened.

In accordance with another aspect of the invention, there is provided a liquid-crystal-on-silicon spatial light modulator comprising a trim retarder, wherein the trim retarder includes a sub-wavelength grating.

In accordance with yet another aspect of the invention, there is further provided a method for imparting a variable phase delay to a beam of light, the method comprising:

(a) propagating the beam through a liquid crystal layer and then through a sub-wavelength grating having grating lines oriented at an angle to a director of the liquid crystal layer;

(b) reflecting the beam propagated in step (a) to propagate the beam back through the liquid crystal layer; and (c) while performing steps (a) and (b), applying an electric field to the liquid crystal layer via a pair of flat electrodes external to, and parallel to the liquid crystal layer and the sub-wavelength grating, to vary an optical retardation of the liquid crystal layer, thereby varying the phase delay of the beam of light; wherein the flatness of the electrodes facilitates spatial uniformity of the applied electric field, thereby facilitating spatial uniformity of the varied optical retardation of the liquid crystal layer.

In a preferred embodiment, the sub-wavelength grating does not contain any metal, which reduces optical loss and electric field fringing or shielding effects.

BRIEF DESCRIPTION OF THE DRAWINGS

Exemplary embodiments will now be described in conjunction with the drawings, in which.

DETAILED DESCRIPTION OF THE INVENTION

While the present teachings are described in conjunction with various embodiments and examples, it is not intended that the present teachings be limited to such embodiments. On the contrary, the present teachings encompass various alternatives, modifications and equivalents, as will be appreciated by those of skill in the art. In FIGS. 2A, 2B and 3A, 3B, and 3C, similar numerals refer to similar elements.

Figure 2A:
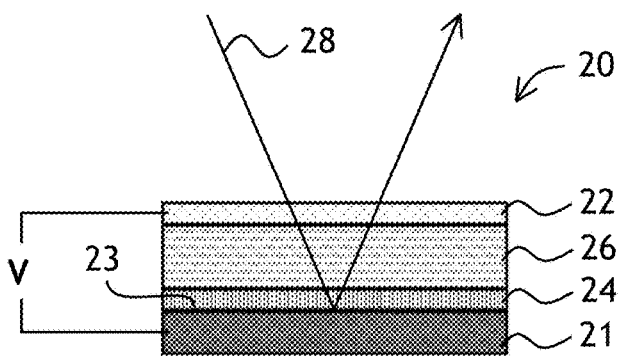
FIGS. 2A and 2B are side and plan cross-sectional views, respectively, of a variable optical retarder of the invention.
Figure 2B:
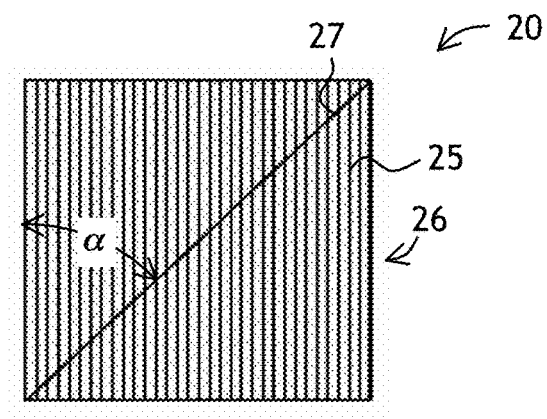

Referring to FIGS. 2A and 2B, a variable optical retarder 20 of the invention includes a first continuous flat electrode 21 and a second substantially transparent continuous flat electrode 22 opposed to the first electrode 21, a liquid crystal layer 26, and a sub-wavelength grating 24 disposed between the liquid crystal layer 26 and the first electrode 21. As seen in FIG. 2B, the sub-wavelength grating 24 has a plurality of grating lines 25 running parallel to each other. A director 27 of the liquid crystal layer 26 is at an angle α of 45 degrees with respect to the grating lines 25. The sub-wavelength grating 24 has a quarter-wavelength retardation in a single pass, amounting to half-wave retardation in a double pass.

Figure 1:
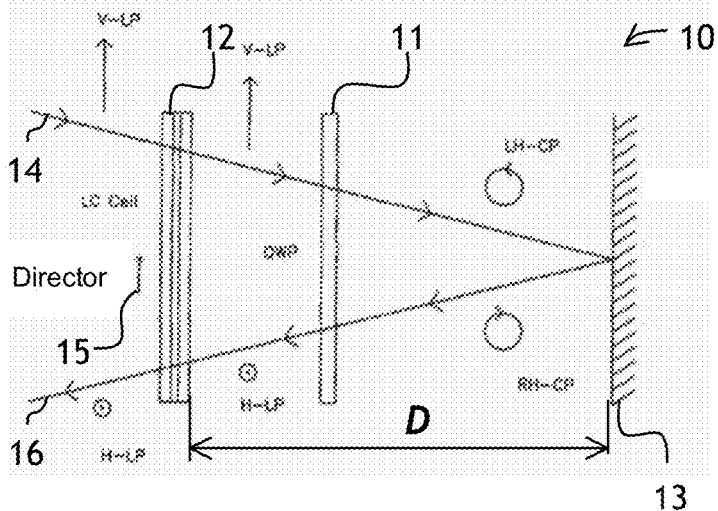
FIG. 1 is a schematic view of a prior-art polarization-insensitive liquid crystal variable optical retarder.

In operation, an optical beam 28 impinges onto the liquid crystal layer 26 through the second electrode 22. A voltage V is applied between the first 21 and second 22 electrodes, thereby varying an optical retardation of the liquid crystal layer 26. As a result, a variable phase delay is imparted to the optical beam 28. The sub-wavelength grating 24 acts as a quarter-wave plate oriented at α=45 degrees to the director 27, switching horizontal and vertical polarizations, as explained above with respect to FIG. 1, which results in lessening a sensitivity of the variable optical retarder 20 to a state of polarization of the optical beam 28. In some embodiments, the angle α is not equal to 45 degrees, but remains an acute angle. The retardation value of the sub-wavelength grating 24 can deviate from a quarter-wave in a single pass, if some polarization dependence is required.

The flatness and evenness of a top surface 23 of the first electrode 21 is beneficial in that the flat and even surface 23 of the first electrode 21, for example flat to within 0.2 micron, or preferably within 0.1 micron, generates a more even electric field than, for example, a corrugated surface would, which the first electrode 21 would have if the sub-wavelength grating 24 were micromachined directly in the first electrode 21. A more even electric field is applied to the liquid crystal layer 26, generating a more uniform optical retardation profile of the liquid crystal layer 26, and thus lessening unwanted and uncontrollable diffraction effects in the liquid crystal layer 26 perturbed by fringing electric fields.

The top surface 23 of the first electrode 21 can be made highly reflective, in which case the sub-wavelength grating 24 is made transmissive. However, the sub-wavelength grating 24 itself can be made highly reflective, for example it can include a multilayer dielectric high reflector, not shown, so that a high reflectivity of the surface 23 of the first electrode 21 is not required. Since metal reflectors necessarily incur some optical loss, a high dielectric reflector of the sub-wavelength grating 24 can have a higher reflectivity then the surface 23 of the first electrode 21, resulting in a lower overall optical loss of the variable optical retarder 20. To further lower the optical loss and prevent electrical field shielding, the sub-wavelength grating 24 is preferably made of a dielectric or a semiconductor, absent any metal therein; for instance, the sub-wavelength grating 24 can include periodic structure of tantala ($Ta_2O_5$) or silicon (Si) in a silicon dioxide ($SiO_2$) host.

Figure 3A:
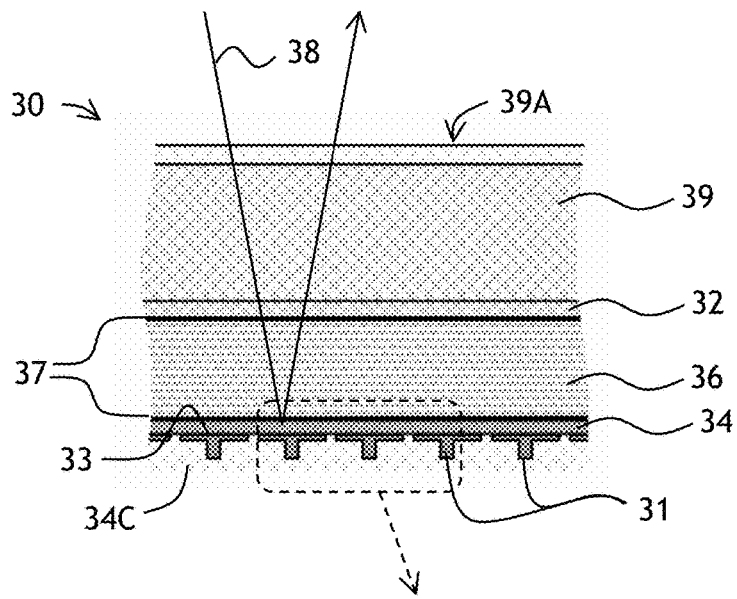
FIG. 3A is a side cross-sectional view of an embodiment of the variable optical retarder of FIGS. 2A and 2B.
Figure 3B:
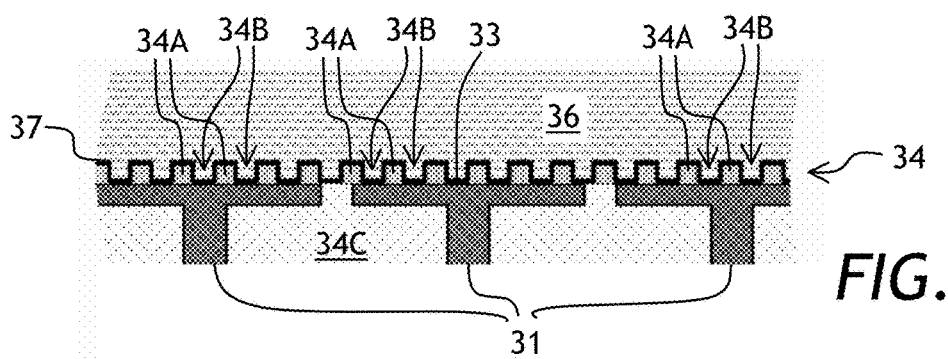
FIGS. 3B and 3C are magnified side cross-sectional views of a pixel area of two embodiments of the variable optical retarder of FIG. 3A.

Referring now to FIGS. 3A and 3B, a variable optical retarder 30 of the invention includes a substrate 34C having a plurality of pixel electrodes 31 formed therein, a sub-wavelength grating 34 disposed on and separate from the pixel electrode 31, a liquid crystal layer 36 on the sub-wavelength grating 34, and a substantially transparent backplane electrode 32 on the liquid crystal layer 36. A glass cover plate 39 supports the backplane electrode 32, made of indium tin oxide (ITO) or other suitable material. The cover plate 39 has an anti-reflection (AR) coating 39A. Alignment layers 37 adhered to the sub-wavelength grating 34 and the backplane electrode 32 are used to align liquid crystal molecules in the liquid crystal layer 36. The sub-wavelength grating 34 has a plurality of grating lines in form of ridges 34A. The liquid crystal layer 36 extends into gaps 34B between the ridges 34A. In the embodiment shown, the substrate 34C is a silicon dioxide substrate.

In operation, an optical beam 38 propagates in succession through the AR coating 39A, the cover plate 39, the transparent backplane electrode 32, the liquid crystal layer 36, impinges onto the sub-wavelength grating 34, and is reflected by top surfaces 33 of the pixel electrodes 31 to propagate back through the stack in reverse order. The liquid crystal layer 36 and the sub-wavelength grating 34 impart first and second optical retardations, respectively, to the optical beam 38. The second optical retardation is varied when a voltage is applied between the pixel 31 and backplane 32 electrodes, thereby imparting a variable phase delay to the optical beam 38 propagating through the liquid crystal layer 36. A director, not shown, of the liquid crystal layer 36 forms a 45 degrees angle with the grating lines 34A, whereby sensitivity of the variable optical retarder 30 to a state of polarization of the optical beam 38 is lessened.

Preferably, the top surfaces 33 of the pixel electrodes 31 are flat to avoid fringing electrical fields and associated liquid crystal refractive index spatial modulation as explained above. To increase reflectivity, the sub-wavelength grating 34 can be made reflective. Also in one embodiment, the liquid crystal layer 36 director forms an acute angle with the grating lines (ridges 34A) not necessarily equal to 45 degrees. Shapes of the grating lines other than rectangular ridges 34A can be used, including triangular, trapezoidal, and the like. The sub-wavelength grating 34 preferably has an optical retardation of a quarter-wavelength in a single pass, that is, a quarter-wavelength retardation when the optical beam 38 propagates down in FIG. 3A, plus a quarter-wavelength retardation when the optical beam 38 is reflected to propagate up in FIG. 3A. As explained above w.r.t. the variable optical retarder 20 of FIG. 2, the sub-wavelength grating 34 of the variable optical retarder 30 of FIG. 3A preferably includes a dielectric or a semiconductor, and most preferably is a pure dielectric absent any metal therein for low optical loss and low disturbance to the electric field generated by the pixel 31 and backplane 32 electrodes. By way of a non-limiting example, the grating lines or ridges 34A of the sub-wavelength grating 34 can be made of tantala ($Ta_2O_5$).

Figure 3C:
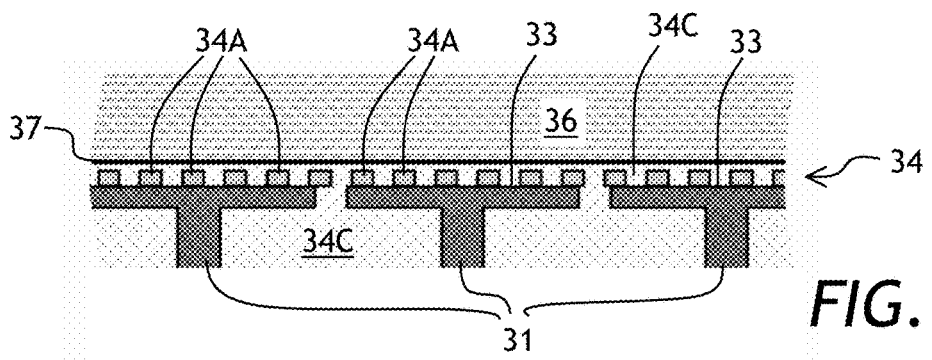

In an embodiment of the variable optical retarder 30 shown in FIG. 3C, the tantala ridges 34A are formed in the silicon dioxide substrate 34C, which planarizes the sub-wavelength grating 34, so that the lower alignment layer 37 is flat, and, accordingly, the liquid crystal layer 36 is flat on both sides. This provides a more stable sub-wavelength grating 34, because it does not include a sub-wavelength grating structure partially formed by liquid crystal material, as is seen in FIG. 3B.

It is to be understood that, although FIGS. 3A to 3C show a plurality of pixel electrodes 31 under the common liquid crystal layer 36, the sub-wavelength grating 34, and the backplane electrode 31, the variable optical retarder 30 can include only one pixel electrode 31, effectively making the variable optical retarder 30 a non-pixilated optical retarder, which can be used in applications where the entire optical beam 38 needs to be given a same variable optical phase shift.

Figure 4:
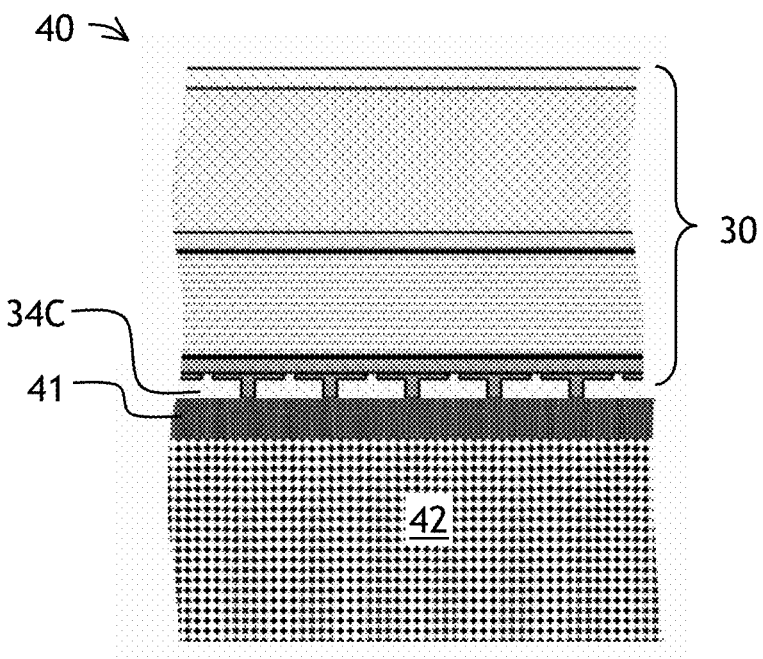
FIG. 4 is a side cross-sectional view of a liquid-crystal-on-silicon (LCoS) implementation of the variable optical retarder of FIG. 3A.

The pixilated variable optical retarders 30 of FIGS. 3A to 3C can be advantageously implemented in liquid-crystal-on-silicon (LCoS) technology. Referring now to FIG. 4, a LCoS variable optical retarder 40 is shown. In the LCoS variable optical retarder 40, the silicon dioxide substrate 34C is an overlayer on a silicon substrate 42 having thereon a driver circuitry 41 under the plurality of pixel electrodes 31, for independently applying a voltage to each of the pixel electrodes 31. The silicon driver electronics 41 can be compact, fast, and can accommodate a very large number of the pixel electrodes 31.

Figure 5:
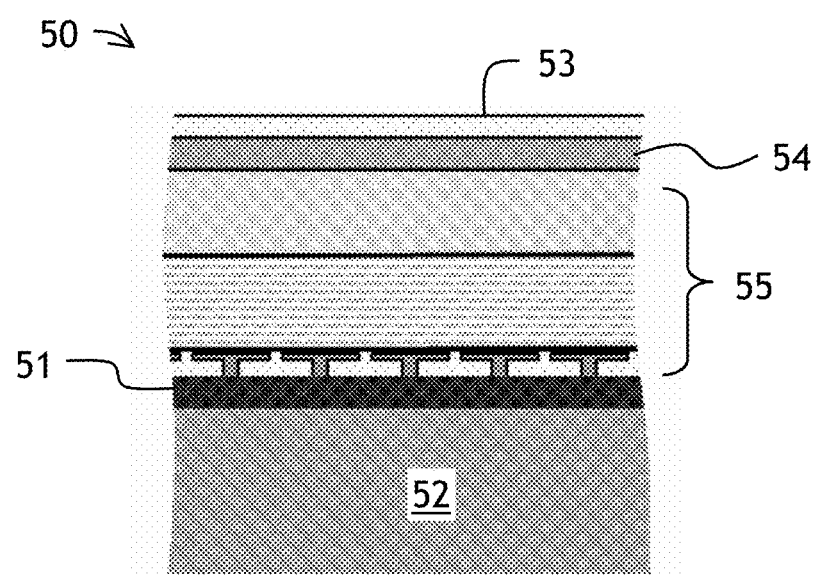
FIG. 5 is a spatial light modulator having therein a trim retarder in form of a sub-wavelength grating.

Speed and compactness of LCoS technology has resulted in its successful use in spatial light modulators for high-definition optical projector equipment. According to one aspect of the present invention, sub-wavelength gratings can be used in a LCoS-based spatial light modulator as a trim retarder. Trim retarders provide a relatively small birefringence which, in combination with the voltage-controlled birefringence of the liquid crystal layer of a LCoS spatial light modulator, provides a wider viewing angle and improves image contrast. Turning to FIG. 5, a spatial light modulator 50 includes a silicon substrate 52, driver electronics 51, a pixilated variable optical retarder 55, a sub-wavelength grating trim retarder 54, and an AR coating 53.

Figure 6:
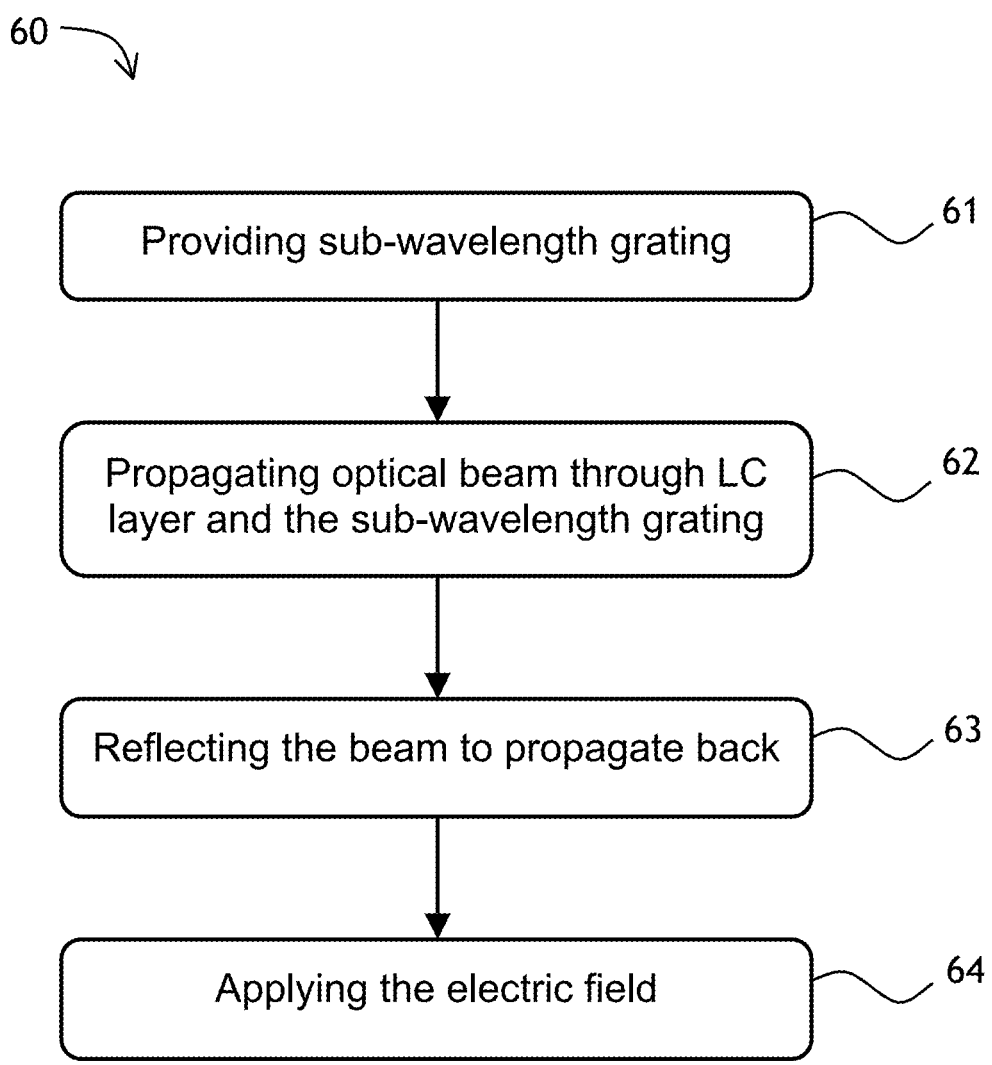
FIG. 6 is a flow chart of a method for imparting a variable phase delay to a beam of light according to the invention.

Turning to FIG. 6 with further reference to FIGS. 2A and 2B, a method 60 for imparting a variable phase delay to a beam of light includes a step 61 of providing the sub-wavelength grating 24; a step 62 of propagating an optical beam 28 through the liquid crystal layer 26, and then through the sub-wavelength grating 24; a step 63 of reflecting the optical beam 28 to propagate back through the liquid crystal layer 26; and a step 64 of applying an electric field to the liquid crystal layer via the pairs of electrodes 21, 22, to vary an optical retardation of the liquid crystal layer 26, thereby varying the phase delay of the beam of light 28. The flatness of the electrodes 21, 22 facilitates spatial uniformity of the applied electric field, thereby facilitating spatial uniformity of the varied optical retardation of the liquid crystal layer 26. Preferably, the sub-wavelength grating 24 has a quarter-wavelength optical retardation in a single pass, and the sub-wavelength grating lines are disposed at the angle of 45+−5 degrees to the director 27 of the liquid crystal layer 26. The method 60 is equally applicable to the variable optical retarders 30 of FIGS. 3A to 3C.

Figure 7:
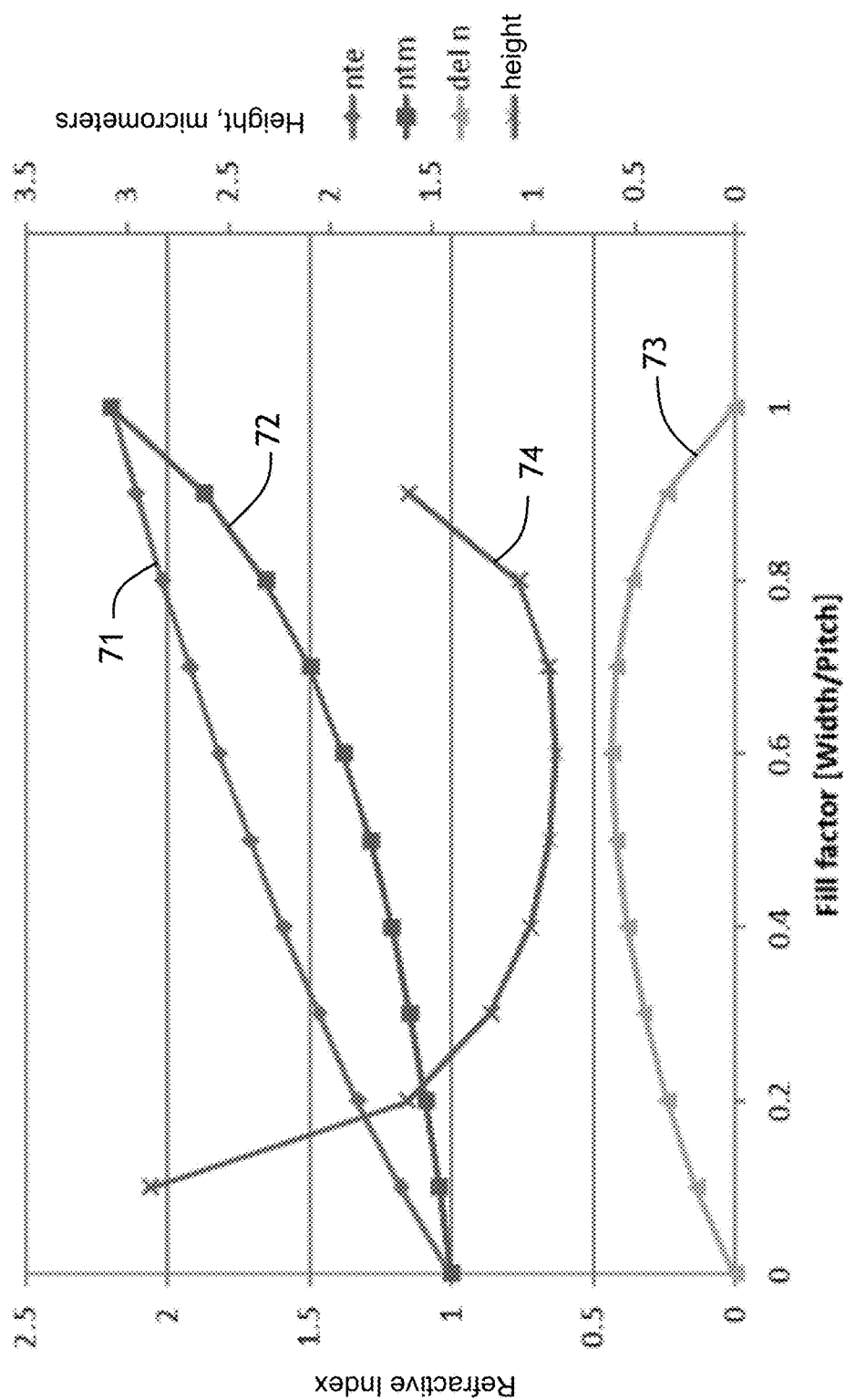
FIG. 7 is a theoretical plot of effective refractive indices, birefringence, and a height of a sub-wavelength grating used in the variable optical retarders of FIGS. 2A, 2B, and FIGS. 3A to 3C, as a function of a fill factor of the sub-wavelength features, computed in an approximation of a grating pitch being much smaller than wavelength.

The optical retardation of the sub-wavelength gratings 24 and 34, and/or the sub-wavelength grating trim retarder 54 can be calculated analytically in an approximation of the grating pitch being much smaller than the wavelength. Referring to FIG. 7, analytically computed effective refractive indices for $T_E$ and $T_M$ polarizations $n_{TE}$ 71 and $n_{TM}$ 72, respectively, birefringence $\Delta n$ 73, and a height 74 of a sub-wavelength grating including rectangular ridges having a refractive index of 2.2; gaps between the ridges having a refractive index of 1.0, are plotted as s function of a fill factor defined as ridge width divided by the grating pitch. The calculation was performed at a telecommunications C-band wavelength of 1.55 micrometers. The maximum value for $\Delta n=0.4$ is observed at the fill factor of 0.6 at the depth of 0.97 micrometers, which corresponds to the optical retardation of 0.4*0.97=0.39 micrometers, or approximately one quarter of the C-band 1.55 micrometers wavelength. This calculation proves that one quarter of wavelength retardation is readily achievable at reasonable height 74 of a sub-wavelength grating.

Figure 8:
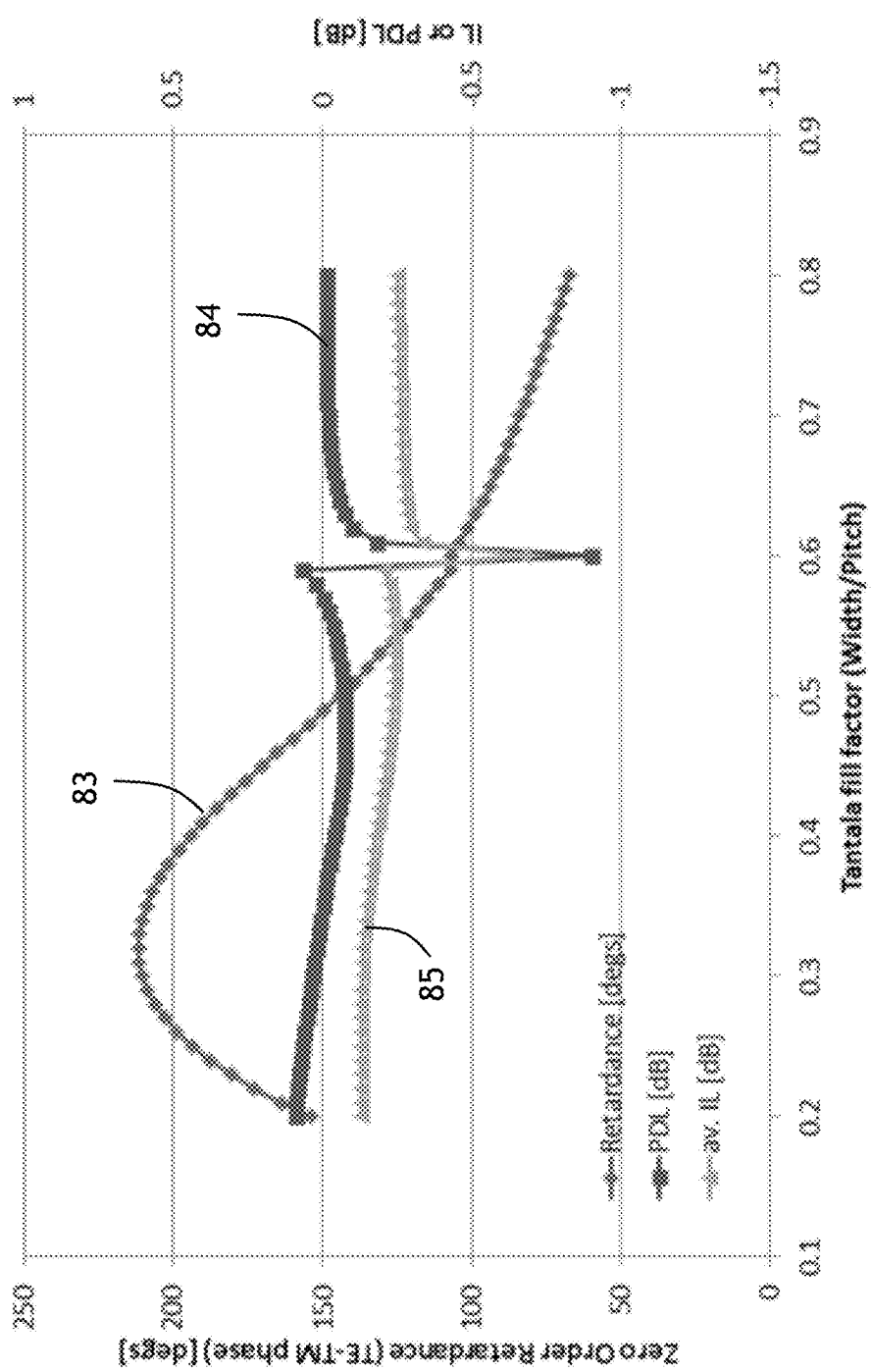
FIG. 8 is the fill factor dependence of an optical retardance, polarization-dependent loss, and insertion loss of an example tantala ($Ta_2O_5$)—air lamellar grating on aluminum substrate, computed using an electromagnetic theory at a finite grating pitch of 0.8 micrometers.

Turning to FIG. 8, a retardance 83, a polarization-dependent loss (PDL) 84, and an insertion loss (IL) 85 are plotted as a function of the above defined fill factor for a sub-wavelength grating having 0.97 micrometers high $Ta_2O_5$ ridges at the pitch of 0.8 micrometers, disposed on aluminum substrate, with air having a refractive index of 1.0 extending into the grooves between the ridges. The retardance 83 is a difference between $T_M$-polarized and $T_E$-polarized zero-order diffracted light phases. One can see that the half-wave retardance occurs at the fill factor of approximately 0.46. The PDL is approximately 0.08 dB, and the average IL is approximately 0.2 dB.

Figure 9:
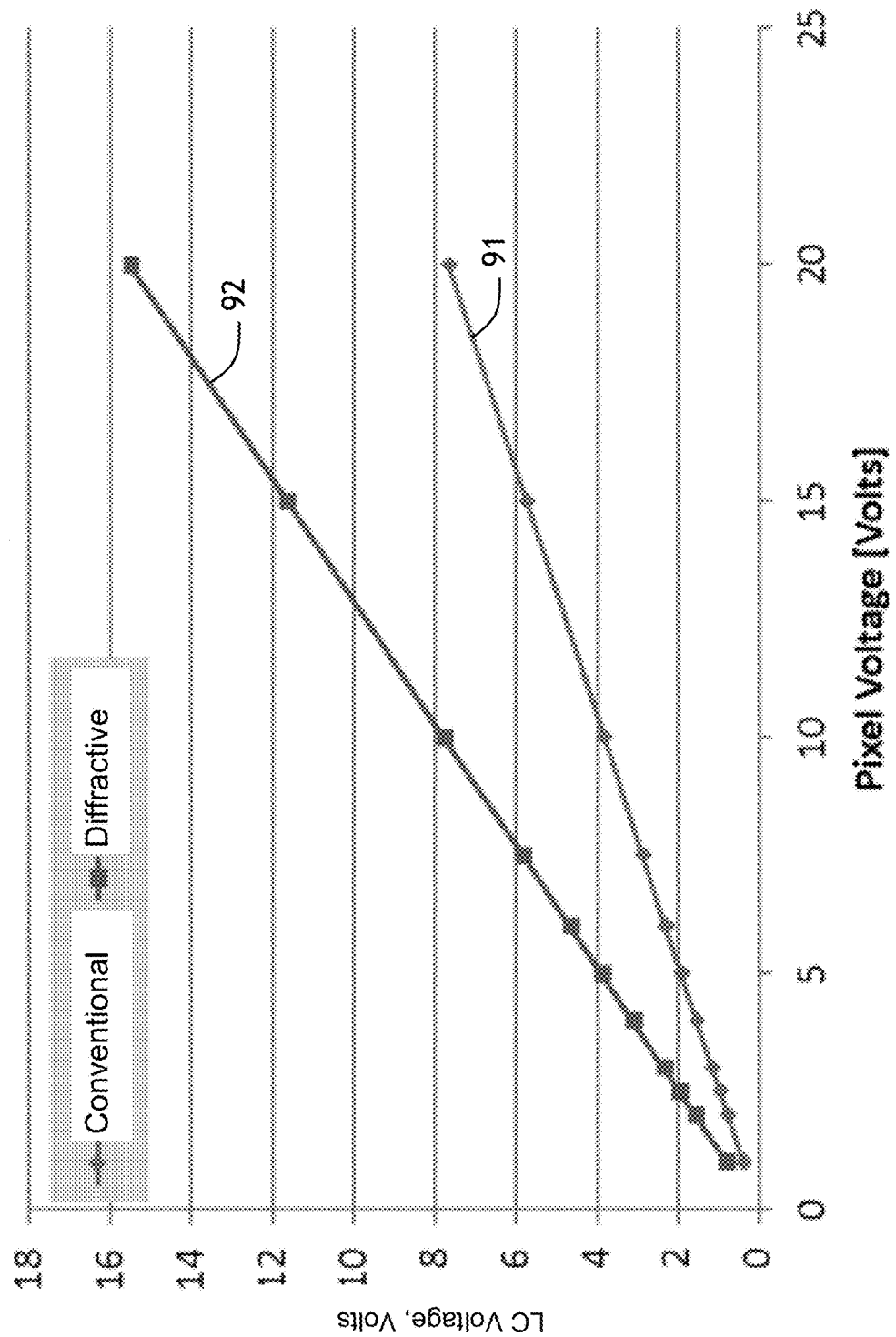
FIG. 9 is a plot of voltage drop across the liquid crystal layer vs. voltage applied to a variable optical retarder having an in-cell sub-wavelength grating, in comparison with a corresponding voltage drop in a variable optical retarder having an in-cell conventional quarter-wave waveplate in place of the in-cell sub-wavelength grating.

The grating structure of FIG. 3B can be modified to accommodate the air-filled grooves. A thin flat membrane, not shown, can be disposed on top of the grating structure 34, to create and seal the air channels 34C between the grating ridges 34A, thereby preventing the liquid crystal fluid of the layer 36 from filling the air channels 34C, and providing a planarizing surface for the subsequently disposed alignment layer 37. For example, a $SiO_2$ membrane can be used for this purpose, Referring now to FIG. 9 with further reference to FIG. 3B, a voltage drop across the liquid crystal layer 36 is plotted as a function of the pixel voltage applied between the pixel electrodes 31 and the transparent backplane electrode 32. A straight line 91 (diamonds) corresponds to a case when a conventional quarter-wave waveplate, not shown, is inserted in place of the sub-wavelength grating 34. A straight line 92 (rectangles) corresponds to the case shown in FIG. 3B, that is, when the sub-wavelength grating 34 is used. One can see that using the sub-wavelength grating 34 approximately doubles the voltage drop across the liquid crystal layer 36 at a same pixel voltage, allowing one to achieve considerably higher levels of variable optical retardation.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A liquid crystal variable optical retarder comprising:
   a pixel electrode;
   a substantially transparent continuous flat electrode opposed to the pixel electrode;
   a liquid crystal layer having a director and disposed between the pixel electrode and the substantially transparent continuous flat electrode, for imparting a variable optical phase shift to light impinging on the substantially transparent continuous flat electrode when a voltage is applied between the pixel electrode and the substantially transparent continuous flat electrode; and
   a sub-wavelength grating disposed between the liquid crystal layer and the pixel electrode and having grating lines at an acute angle to the director,
   wherein the grating lines comprise ridges defining gaps therebetween,
   wherein the ridges are formed in a substrate and the pixel electrode is located in the substrate,
   wherein the substrate, the ridges, and the pixel electrode are each located below a flat alignment layer that separates the liquid crystal layer from the ridges,
   wherein neither the pixel electrode nor the substantially transparent continuous flat electrode includes a portion that extends into the sub-wavelength grating, and
   wherein the pixel electrode extends downward in a direction opposite to the sub-wavelength grating.

2. The liquid crystal variable optical retarder of claim 1, wherein the sub-wavelength grating comprises a dielectric or semiconductor grating.

3. The liquid crystal variable optical retarder of claim 1, wherein the sub-wavelength grating comprises a reflective grating absent any metal therein.

4. The liquid crystal variable optical retarder of claim 1, wherein the acute angle is 45+−5 degrees.

5. The liquid crystal variable optical retarder of claim 1, wherein the sub-wavelength grating has a quarter-wave retardation in a single pass.

6. The liquid crystal variable optical retarder of claim 1, wherein the sub-wavelength grating is a dielectric grating.

7. The liquid crystal variable optical retarder of claim 1, wherein the ridges are made of tantala.

8. A variable optical retarder for imparting a variable phase delay to an optical beam impinging thereon, the variable optical retarder comprising:
   a substrate;
   a pixel electrode;
   a sub-wavelength grating, disposed on and separate from the pixel electrode, for imparting a first optical retardation to the optical beam impinging thereon, the sub-wavelength grating having a plurality of grating lines running parallel to each other;

a liquid crystal layer, disposed on the sub-wavelength grating, for imparting a second optical retardation to the optical beam propagating there through; and a substantially transparent backplane electrode disposed on the liquid crystal layer, wherein the second optical retardation is varied when a voltage is applied between the pixel electrode and the substantially transparent backplane electrode, thereby imparting the variable phase delay to the optical beam propagating through the liquid crystal layer, wherein a director of the liquid crystal layer forms an acute angle with the grating lines, whereby sensitivity of the variable optical retarder to a state of polarization of the optical beam is lessened, wherein the grating lines comprise ridges defining gaps therebetween, wherein the ridges are formed in the substrate and the pixel electrode is located in the substrate, wherein the substrate, the ridges, and the pixel electrode are each located below a flat alignment layer that separates the liquid crystal layer from the ridges, wherein neither the pixel electrode nor the substantially transparent backplane electrode includes a portion that extends into the sub-wavelength grating, and wherein the pixel electrode extends downward in a direction opposite to the sub-wavelength grating.

9. The variable optical retarder of claim 8, wherein the pixel electrode has a continuous flat top surface.

10. The variable optical retarder of claim 8, wherein the sub-wavelength grating comprises a dielectric or a semiconductor.

11. The variable optical retarder of claim 8, wherein the sub-wavelength grating comprises a dielectric grating absent any metal therein.

12. The variable optical retarder of claim 8, wherein the sub-wavelength grating is reflective.

13. The variable optical retarder of claim 8, wherein the sub-wavelength grating comprises at least one of silicon dioxide, tantala, or silicon.

14. The variable optical retarder of claim 8, wherein the acute angle is equal to 45+−5 degrees.

15. The variable optical retarder of claim 8, further comprising:

a plurality of pixel electrodes under the liquid crystal layer, the sub-wavelength grating, and the substantially transparent backplane electrode.

16. The variable optical retarder of claim 15, wherein the substrate comprises a silicon substrate, and the variable optical retarder further comprises driver circuitry, disposed on the silicon substrate under the plurality of pixel electrodes, for independently applying a voltage to each of the plurality of pixel electrodes.

17. The variable optical retarder of claim 8, further comprising:

a cover plate, disposed on the substantially transparent backplane electrode, wherein the cover plate has an anti-reflection coating.

18. The variable optical retarder of claim 8, wherein the sub-wavelength grating has a quarter-wave retardation in a single pass.

19. The variable optical retarder of claim 8, further comprising:

a plurality of pixel electrodes that extend into the substrate.

20. The variable optical retarder of claim 8, wherein the ridges are made of tantala.

* * * * *